(12) United States Patent
Taniuchi et al.

(10) Patent No.: US 9,636,897 B2
(45) Date of Patent: May 2, 2017

(54) MANUFACTURING METHOD OF STRUCTURE AND MANUFACTURING APPARATUS

(71) Applicant: CANON KABUSHIKI KAISHA, Tokyo (JP)

(72) Inventors: Hiroshi Taniuchi, Yokohama (JP); Kazuhiro Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 14/240,009

(22) PCT Filed: Jun. 17, 2013

(86) PCT No.: PCT/JP2013/003759
§ 371 (c)(1),
(2) Date: Feb. 20, 2014

(87) PCT Pub. No.: WO2013/190817
PCT Pub. Date: Dec. 27, 2013

(65) Prior Publication Data
US 2014/0182775 A1    Jul. 3, 2014

(30) Foreign Application Priority Data
Jun. 19, 2012 (JP) ................................. 2012-137917

(51) Int. Cl.
*B32B 37/02* (2006.01)
*G03G 15/22* (2006.01)
*B29C 67/00* (2017.01)

(52) U.S. Cl.
CPC .......... *B32B 37/02* (2013.01); *B29C 67/0059* (2013.01); *B29C 67/0074* (2013.01);
(Continued)

(58) Field of Classification Search
CPC . B32B 37/02; B29C 67/0051; B29C 67/0092; G03G 15/224
(Continued)

(56) References Cited

U.S. PATENT DOCUMENTS 5,506,607 A   4/1996  Sanders, Jr. et al.
5,876,550 A   3/1999  Feygin
(Continued)

FOREIGN PATENT DOCUMENTS

CN   101561674 A   10/2009
EP     0712050 A2   5/1996
(Continued)

*Primary Examiner* — Philip Tucker
*Assistant Examiner* — John Blades
(74) *Attorney, Agent, or Firm* — Canon U.S.A. Inc., IP Division

(57) ABSTRACT

A manufacturing method of a structure includes providing a stack of a first material layer to be a part of the structure and a restricting member wherein the first material layer is provided on a surface of the structure in the process of formation, and a part of the restricting member is provided on a surface of the first material layer in reverse of the surface of the structure in the process of formation, providing a support member between the restricting member and the surface of the structure in the process of formation, removing the restricting member, and providing a second material layer to be a part of the structure on surfaces of the first material layer and the support member exposed by removing the restricting member.

14 Claims, 7 Drawing Sheets

(52) U.S. Cl.
CPC ....... *B29C 67/0092* (2013.01); *G03G 15/224* (2013.01); *Y10T 156/17* (2015.01)

(58) Field of Classification Search
USPC .... 156/246, 273.3, 273.5, 273.7, 275.5, 501
See application file for complete search history.

(56) References Cited

U.S. PATENT DOCUMENTS

| | | |
|---|---|---|
| 6,136,132 A | 10/2000 | Kinzie |
| 2001/0042598 A1 | 11/2001 | Yamada |

FOREIGN PATENT DOCUMENTS

| | | | | |
|---|---|---|---|---|
| JP | 8281808 A | | 10/1996 | |
| JP | 2003053849 A | | 2/2003 | |
| JP | 2003-159754 | * | 6/2003 | ............. B29C 67/00 |
| JP | 2003159754 A | | 6/2003 | |
| JP | 2012040757 A | | 3/2012 | |
| RU | 2427647 C2 | | 8/2011 | |
| WO | 96/11117 A1 | | 4/1996 | |
| WO | 2012/076205 A1 | | 6/2012 | |

\* cited by examiner

MANUFACTURING METHOD OF STRUCTURE AND MANUFACTURING APPARATUS

TECHNICAL FIELD

The present invention relates to a manufacturing method of a structure and a manufacturing apparatus.

BACKGROUND ART

In recent years, modeling of an intricately-shaped three-dimensional object designed using a computer has become popular. There is a great need in the field of manufacturing of a wide variety of products in relatively small quantities, for example, minute machine parts, and exhibition samples of houses and foods.

As an example of such a method for making a three-dimensional object, a method is known in which a material to be a three-dimensional object is stacked in layers and a final structure is manufactured.

In PTL 1, after a layer of the shape of a part of a three-dimensional object is formed, a material to be a support is provided so as to surround this layer, and patterning is performed. A support member (support) is thereby formed, and more material to be the three-dimensional object is stacked on the layers of the support and the three-dimensional object in the process of formation. Such a method is disclosed.

CITATION LIST

Patent Literature

PTL 1: US2001/0042598

SUMMARY OF INVENTION

Technical Problem

However, in the method of PTL 1, the layer of the support and the layer of the three-dimensional object are made in different processes and of different materials, and therefore it is difficult to equalize the thickness of both layers in the process of formation. Since the amount of volume change due to the effect of temperature or the like varies depending on the material, it is supposed that the layer thickness differs between the layer to be the three-dimensional object and the layer of the support. In an object formed by stacking layers having different thicknesses, distortion is caused by the difference in layer thickness described above, and there is fear that the desired final shape of the three-dimensional object cannot be obtained.

Solution to Problem

The present invention provides a manufacturing method by which a structure formed with a high degree of shape accuracy can be obtained.

In an aspect of the present invention, a manufacturing method of a structure includes providing a stack of a first material layer to be a part of the structure and a restricting member wherein the first material layer is provided on a surface of the structure in the process of formation, a part of the restricting member is provided on a surface of the first material layer in reverse of the surface of the structure in the process of formation, and the other part is provided above the surface of the structure in the process of formation, providing a support member so as to fill between the restricting member and the surface of the structure in the process of formation, removing the restricting member, and providing a second material layer to be a part of the structure on surfaces of the first material layer and the support member exposed by removing the restricting member.

Advantageous Effects of Invention

According to an example of the present invention, in the process of stacking, the surface of a layer to be a structure and the surface of a layer of the support member can be made accurately coplanar compared to the related art, and a structure formed with a high degree of shape accuracy can be obtained.

Further features of the present invention will become apparent from the following description of exemplary embodiments with reference to the attached drawings.

DESCRIPTION OF EMBODIMENTS

Embodiments of the present invention will be described below with reference to the drawings.

First Embodiment

Figure 1A:
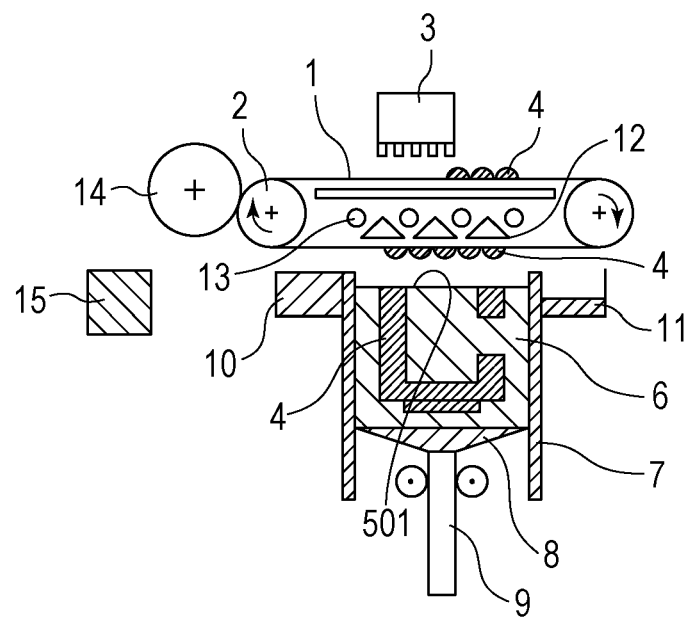
FIGS. 1A-1B are schematic diagrams showing an example of a stacking modeling apparatus according to a first embodiment of the present invention.
Figure 1B:
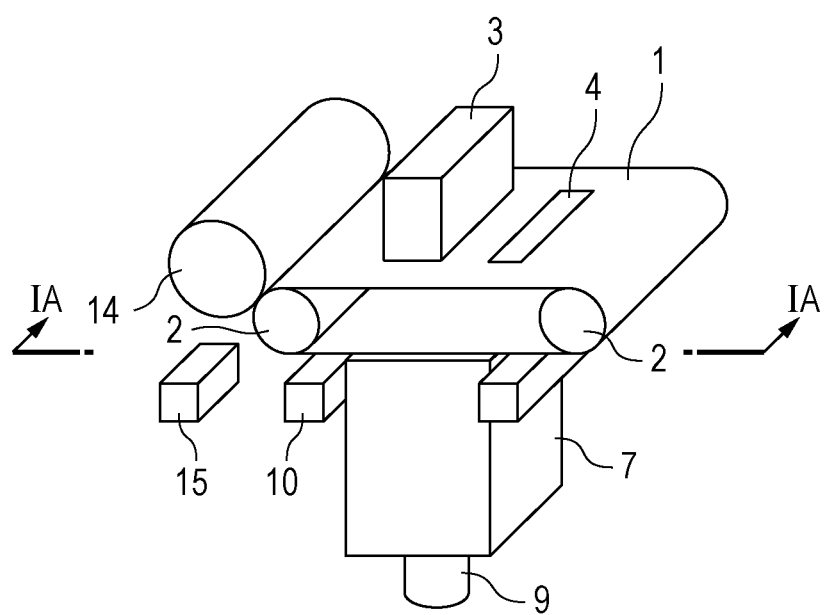

FIGS. 1A and 1B are schematic diagrams showing an example of a stacking modeling apparatus that is a manufacturing apparatus performing a manufacturing method of an object that is a three-dimensional structure, according to a first embodiment of the present invention. FIG. 1B is a perspective view of the whole apparatus, and FIG. 1A is a sectional view of the apparatus taken along line IA-IA of FIG. 1B perpendicularly to the surface of an intermediate transfer member 1. The intermediate transfer member 1 is conveyed by a conveyance mechanism 2. In FIGS. 1A and 1B, patterning of a three-dimensional object is performed on the intermediate transfer member 1 disposed like a belt, the pattern is conveyed by the conveyance mechanism 2 to the position of a modeling table 8, and is stacked into the three-dimensional object here. On the intermediate transfer member 1, UV ink 4 ejected from a liquid ejection head 3 is provided as a modeling pattern, and is conveyed to the position of the modeling table 8. On the modeling table 8, a modeling pattern 4 as a structure in the process of formation is already disposed in a stacked state and a state supported by a support member 6. The support member 6 is injected into a container 7 by a support filling mechanism 10. After the stacking of layers of the modeling pattern is completed, the support member 6 can be removed by a support removing mechanism 15. The support removing mechanism 15 may be provided inside the stacking modeling apparatus, or the stacked layers of modeling pattern and the support member 6 may be taken out of the stacking modeling apparatus, and the support member 6 may be removed using an external removing mechanism such as a chamber of solvent.

After a modeling pattern is formed on the surface of the intermediate transfer member 1, the modeling pattern needs to be transferred. Therefore, the intermediate transfer member 1 can be made of a material having a high releasability from the modeling material. If the material of the intermediate transfer member 1 does not have releasability, for example, if the modeling material is transferred like the offset printing, an object can be created. From the viewpoint of modeling accuracy, all of the modeling material on the intermediate transfer member 1 can be transferred.

In order to stably perform transfer, the intermediate transfer member 1 can have not a little elasticity. Materials suitable as the intermediate transfer member 1 include silicone rubber and fluoro-rubber. Depending on the modeling material used for patterning, sometimes repelling occurs. Therefore, the intermediate transfer member 1 can be surface-treated according to the modeling material. The rubber hardness depends on the thickness of the elastic body. When the elastic body is thick, a hard rubber can be used. When the elastic body is thin, a relatively soft rubber can be used. When the elastic body is thick, a rubber having a hardness of about 80 degrees is suitable. When the intermediate transfer member 1 is treated like a belt as in the apparatus in the figures, a relatively soft rubber having a rubber hardness of about 50 degrees to 20 degrees can be used in the form of a thin film having a thickness of about 0.1 to 0.5 mm.

When a high accuracy is required, a non-elastic polytetrafluoroethylene sheet or a film coated with a submicron thickness of a mold release agent is suitable.

In the apparatus of FIGS. 1A and 1B, an ejection head having ejection ports that eject liquid is shown as a unit for forming a modeling pattern on the intermediate transfer member 1, and a method in which a modeling material is ejected from the ejection head onto a desired position is shown. However, the present invention is not limited to this. Examples of other units include a digital recording apparatus such as an electrophotographic device or a dispenser. Patterns can be formed using a patterning method using a printing plate, such as offset printing or screen printing, while changing the printing plate used. Patterns obtained by a method such as photolithography or electrolytic plating can be used without any problem. The patterning unit does not necessarily have to be located in the stacking modeling apparatus. In the present invention, patterns manufactured in an environment most suitable for each method and material can be used. That is, the patterning unit can be selected based on the material of the object and the modeling accuracy. In particular, an inkjet, which can perform patterning in a non-contact manner, is a very suitable patterning unit.

Layer-like modeling patterns are formed using UV ink 4 as a molding material that is a material for formation. UV ink is solidified by irradiating with ultraviolet, and a lightweight and relatively strong object can be made. Besides UV ink, hot melt ink and thermoset ink are also suitable. In this method, as described above, a patterning mechanism does not necessarily have to be disposed in the stacking apparatus, and layer-like patterns each layer of which is made using a different patterning mechanism in the same model according to the required accuracy and the material can also be stacked. By disposing different color materials in a layer-like pattern, a desired color of layer can be obtained. The modeling material can be freely selected within the range of application of the patterning unit used, and the patterning unit can be selected according to the material that one wants to use.

Figure 6A:
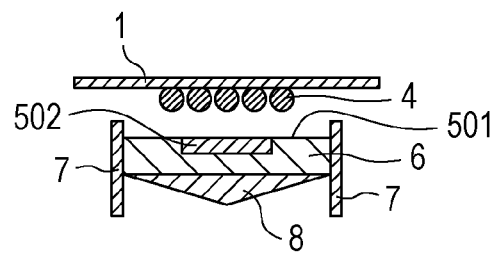
FIGS. 6A-6F are schematic sectional views showing a part of the process of the manufacturing method of a structure in the stacking modeling apparatus according to the first embodiment of the present invention.
Figure 6B:
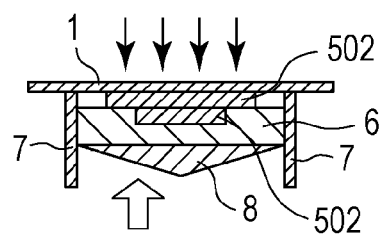

Here, FIGS. 6A to 6F are schematic sectional views for explaining a part of the manufacturing process in the manufacturing apparatus of a structure according to an embodiment of the present invention, and show the same section as FIG. 1A. The object in the process of formation shown in FIGS. 6A to 6F is the same as that shown in FIGS. 1A and 1B but is simplified. The patterned modeling material shown in FIG. 1A is conveyed by the conveyance mechanism 2 onto the modeling table 8, is aligned with the object in the process of formation by an alignment unit (not shown), and is brought into a state shown in FIG. 6A. Next, as shown in FIG. 6B, a stacking unit including a modeling container 7, a modeling table 8, a raising and lowering mechanism 9, a support filling mechanism 10, and a support receiver 11 moves upward and comes into contact with the ink pattern 4.

The transfer surface 501 that comes into contact with the ink pattern 4 is a plane formed by a modeling pattern 502 that is a structure in the process of formation prepared by being previously transferred and stacked, and a support member 6 that is a solidified supporting material. The transfer surface 501 is held at a position lower than the upper end of the modeling container 7 by one layer thickness by the raising and lowering mechanism 9. The transfer surface 501 is raised until the upper end of the modeling container 7 comes into contact with the intermediate transfer member 1. The UV ink is sandwiched between two planes: the surface of the intermediate transfer member 1 and the transfer surface 501, and both the upper and lower surfaces of the UV ink are planarized with a high degree of accuracy. Only the modeling material is transferred at the time of stacking. Therefore, the shape can be reproduced with a high degree of accuracy without the effect of contraction or deformation between different materials. The modeling material is held in this state and is irradiated with ultraviolet light from a UV lamp 12 (shown in FIGS. 1A and 1B) disposed as a hardening and bonding unit. The UV ink is hardened with its surface planarized, is integrated with the previous modeling pattern, and forms an expanded modeling pattern 502. Hardening may be promoted by heat from the heater 13.

Figure 6C:
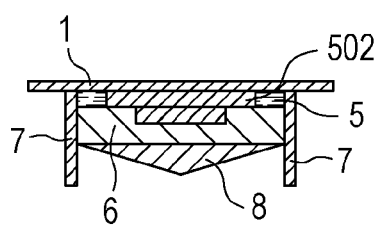

Next, as shown in FIG. 6C, a supporting material 5 for the support member is injected into the modeling container 7 in a liquid state. The modeling container 7 has a shape surrounding the modeling table 8 and restricts the filling range of the supporting material. The supporting material automatically flows into a space where the modeling pattern 502 does not exist, and therefore there is no need for alignment and layer thickness restriction. It is only necessary to stop injection when the space has been filled with the supporting material 5, just before the supporting material 5 overflows.

The inner surface of the modeling container 7 needs to be prevented from adhering to the liquid supporting material used, and is preferably coated with polytetrafluoroethylene or the like.

As a material of the support member 6, a liquid material that is solidified by an external stimulus is suitable. In addition, a material that can be easily removed from the object is suitable. External stimuli include heat, light, electricity, magnetism, and vibration. In particular, heat is easy to utilize the reversibility of the material. When, for example, paraffin wax is used as a supporting material 6, it can be injected at a temperature above the melting point and can be solidified by lowering the temperature below the melting point. If the melting point of the supporting material is set below the melting point of the modeling material, the support can be easily removed by keeping the whole above the melting point of the supporting material and below the melting point of the modeling material for a predetermined length of time after the modeling is completed.

The support can be injected using a normal liquid moving method such as pressure injection or reduced-pressure suction. In order to prevent defective filling, it is effective to increase the flowability by heating with the heater 13 as a temperature control mechanism, or to assist filling by applying minute high-frequency vibration with an ultrasonic vibrator or reducing the pressure.

The injection of the supporting material can be basically performed every time a layer is stacked but sometimes need not be performed every time a layer is stacked. When modeling a shape in which an overhang does not exist, a support need not be used if the strength at the middle stage of modeling is sufficient.

When modeling an object having an overhang, it is possible to stack layers without injecting support when stacking layers of modeling material without an overhang and to inject support for a plurality of layers at a time when stacking layers having an overhang. In particular, when the layer thickness is small and the filling of the supporting material is difficult, the supporting material can be injected at intervals.

Figure 6D:
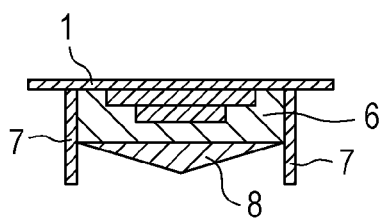

As shown in FIG. 6D, the supporting material 5 is solidified, is thereby integrated with the already formed support member, and forms an expanded support member 6.

Figure 6E:
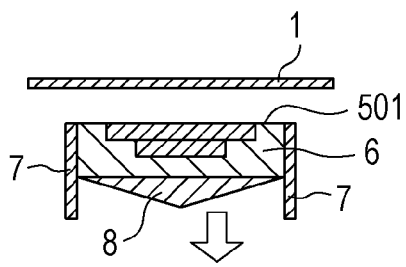

Next, as shown in FIG. 6E, the intermediate transfer member 1 is peeled and removed from the upper surface 501. The support member 6 after solidification can hold the modeling pattern, and therefore even an isolated part forming an overhang can be fixed at a specified position. Therefore, the intermediate transfer member 1 can be peeled after the support is solidified.

Figure 6F:
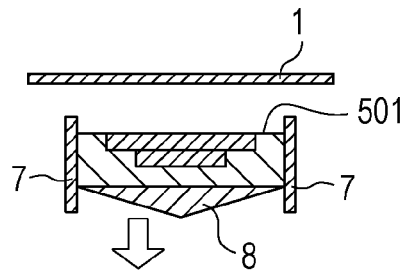

The upper surface 501 of the modeling pattern exposed by peeling the intermediate transfer member 1 has been restricted by the surface of the intermediate transfer member 1. Therefore, the support member 6 and the modeling pattern 502 can form an even, and highly accurately flat surface. This surface is moved by the raising and lowering mechanism 9 to a position lower than the upper end of the modeling container 7 by one layer thickness as shown in FIG. 6F in order to prepare to receive the next ink pattern in which ink is disposed in a cross-section of the object. The peeling of the intermediate transfer member 1, the lowering of the stacking unit, and the lowering of the transfer surface from the upper end of the modeling container 7 may be performed in any order.

In FIGS. 1A and 1B, after the transfer of an ink pattern is completed, the surface of the intermediate transfer member 1 is cleaned by the cleaner 12 as needed, and the intermediate transfer member 1 is repeatedly used. However, the present invention is not limited to this. The intermediate transfer member 1 may be disposed after use, or may be recycled.

Second Embodiment

Figure 2A:
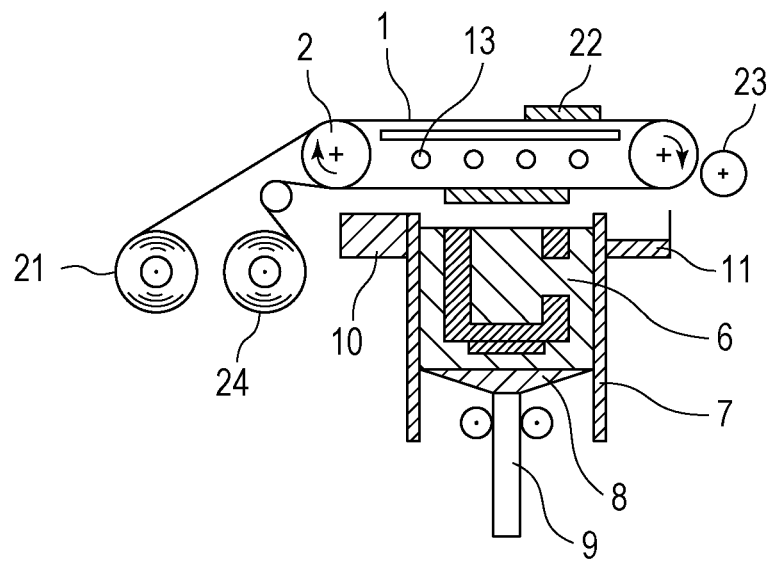
FIGS. 2A-2B are schematic diagrams showing an example of a stacking modeling apparatus according to a second embodiment of the present invention.
Figure 2B:
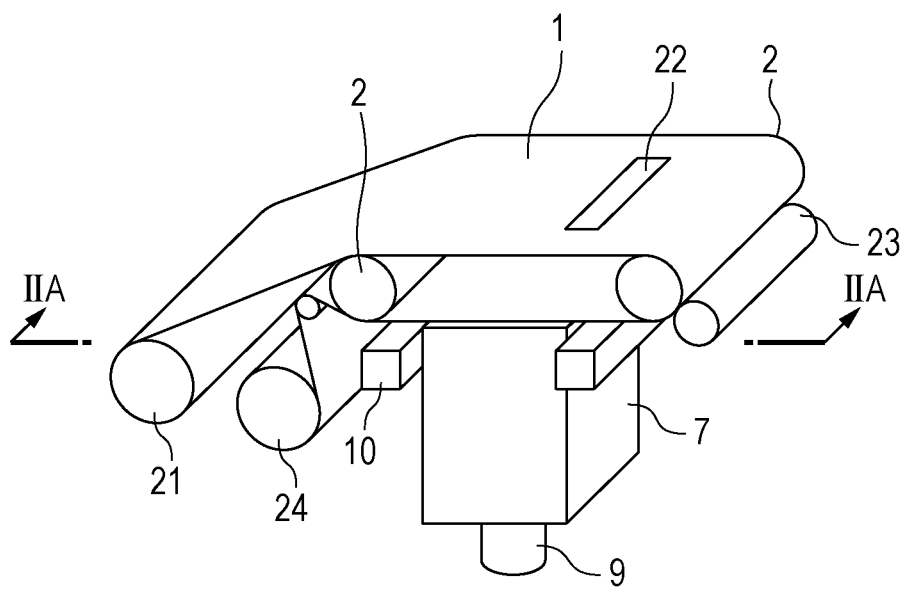

FIGS. 2A and 2B are schematic diagrams showing an example of a stacking modeling apparatus that is a manufacturing apparatus performing a manufacturing method of an object that is a three-dimensional structure, according to a second embodiment of the present invention. FIG. 2B is a perspective view of the whole apparatus, and FIG. 2A is a sectional view of the apparatus taken along line IIA-IIA of FIG. 2B perpendicularly to the surface of an intermediate transfer member 1.

The apparatus of FIG. 2 does not have therein a patterning mechanism for forming an object. The stacking unit including a modeling table 8 supporting a support member 6 and an object, a raising and lowering mechanism 9, a modeling container 7, and an intermediate transfer member 1 is the same as that of the first embodiment. The support filling mechanism 10, the support receiver 11, and the roller 2 are also the same as those of the first embodiment.

In this embodiment, the modeling pattern 22 used can be made, for example, by partially applying polyester resin onto the intermediate transfer member 1 using a separate screen printing apparatus and then hardening the polyester resin. As the intermediate transfer member 1, for example, a PET film thinly coated with silicone rubber can be used.

The intermediate transfer member 1 on which a patterned layer for forming an object is already provided is set in the apparatus. Although an intermediate transfer member 1 wound into a roll is shown in FIGS. 2A and 2B, sheet-like intermediate transfer members 1 stacked in order may be supplied one by one from a sorter.

When, as described above, an apparatus that patterns a layer to be an object is separate from a stacking apparatus, less wasteful operation can be performed if the apparatuses differ in processing speed. In addition, when patterns are subjected to inspection by an inspection apparatus for inspecting whether or not patterning is properly performed, after patterning and before stacking, the inspection can be performed efficiently.

In the apparatus of FIGS. 2A and 2B, the layer-like modeling pattern 22 on the intermediate transfer member 1 is solidified, and a mechanism that applies adhesive to the modeling pattern 22 in order to perform bonding at the time of stacking is disposed. The modeling pattern 22 comes into contact with the adhesive application mechanism by the conveyance by the conveyance mechanism, and passes over it, and adhesive is applied to the surface of the modeling pattern 22.

Although the type of adhesive used is not limited, adhesive can be selected according to the material of the object, based on indices such as contraction ratio and adhesive strength. Although a roll coater is depicted as an adhesive applicator, the present invention is not limited to this, and a spray-type application mechanism such as a spray can also be used.

When a spray is used, adhesive adheres to the surface of the intermediate transfer member other than the object. After the stacking is completed, and at the stage of reliquefying and removing the support, the adhesive is removed at the same time. However, when the material of the support member is reused, the adhesive needs to be separated by filtration or the like. In that regard, a roll coater mechanism that can apply adhesive only on the upper surface of the modeling pattern existing like a protrusion is a suitable applicator.

The bonding method at the time of stacking is not limited to application of adhesive. For example, it is also possible to form a cross-sectional pattern of an object from thermoplastic resin, to bring the pattern into a molten state by heating at the time of stacking, and to stack the pattern without using adhesive.

The process of stacking is the same as that of the first embodiment. After the transfer is completed, the intermediate transfer member is rewound by a rewinding mechanism 24, and is reused.

The greatest advantageous effect obtained by the present invention is that, in each layer-like pattern, there is no difference in thickness between the modeling material and the material of the support member, and very high thickness accuracy can be reproduced. An object manufactured by this does not have any distortion and is highly accurate.

In the above first and second embodiments, the intermediate transfer member 1 serves as a restricting member that restricts the upper surfaces of the support member 6 and the modeling pattern when expanding the support member 6. However, a restricting member separate from the intermediate transfer member 1 may be used. For example, in FIGS. 6A to 6F, after the ink pattern 4 is transferred to the transfer surface 501 by the intermediate transfer member 1 and the modeling pattern 502 is formed, the intermediate transfer member 1 may be removed, and a restricting member separate from the intermediate transfer member 1 may be brought into contact with the upper surface of the modeling pattern 502. After that, the supporting material 5 may be injected, and a support may be formed while restricting the upper surface of the support member 6 with the restricting member so that the upper surface of the support member 6 is coplanar with the upper surface 501 of the modeling pattern.

Figure 3:
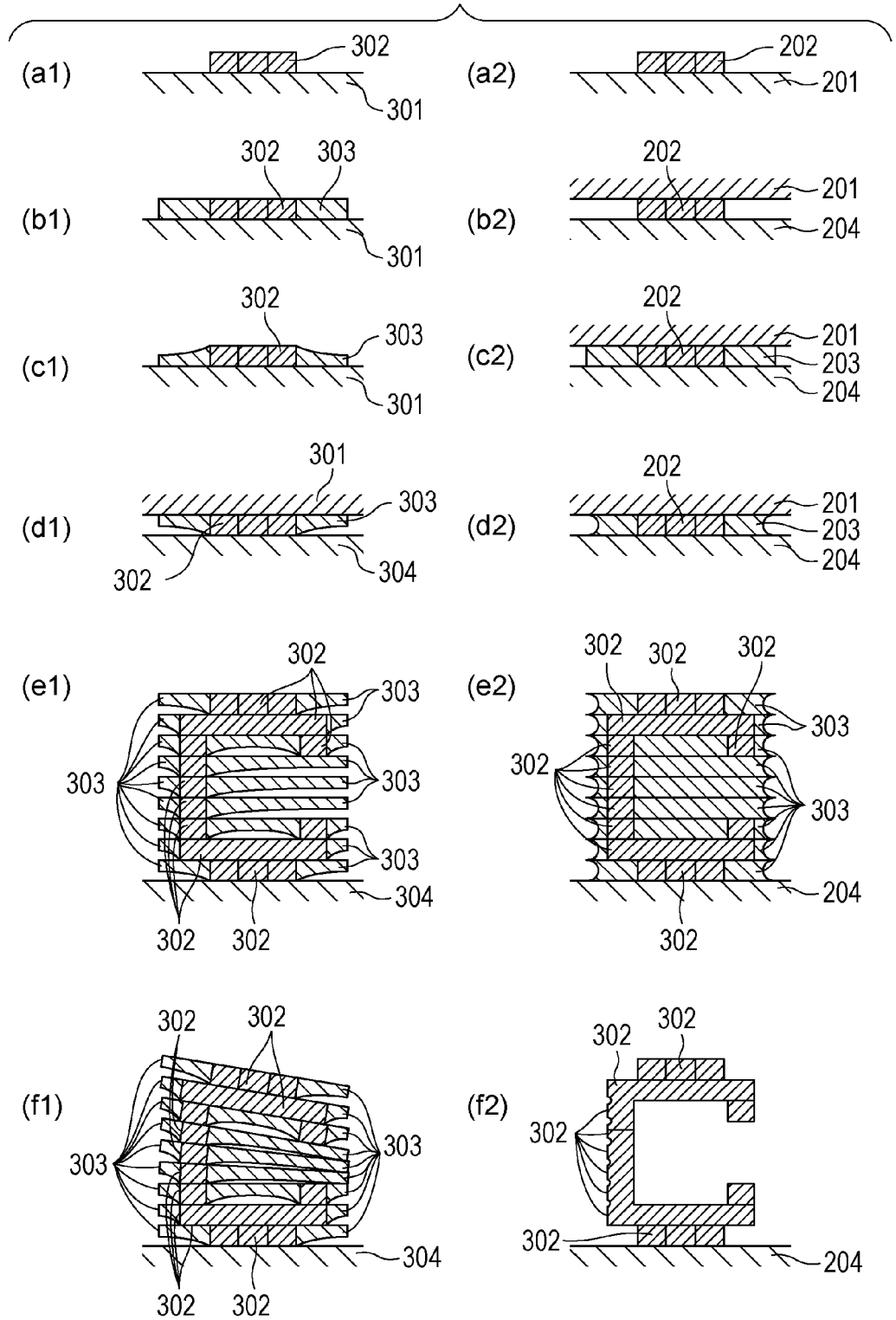
FIG. 3 includes sectional views schematically showing steps of each of an example of the manufacturing method of a structure according to the first embodiment of the present invention and a manufacturing method of a structure of a comparative embodiment.

FIG. 3 includes sectional views schematically showing steps of each of an example of the manufacturing method of a structure according to the first embodiment of the present invention and a manufacturing method of a structure of a comparative embodiment, and illustrates the effect of the thickness accuracy of the layer-like patterns on the object. In FIG. 3, (a1) to (f1) show a comparative embodiment, and (a2) to (e2) show a stacking method according to an embodiment of the present invention.

FIG. 3 (a1) shows a state where a layer-like modeling pattern 302 is formed on a base material 301.

Next, a support member 303 is disposed around the modeling pattern 302. This state is shown in FIG. 3 (b1). Next, the support member hardens and a volume change is thereby caused. The volume change is expansion or contraction depending on the material. In general, contraction often occurs, and contraction is shown in the explanatory diagrams. At this time, the surface is open, and owing to the difference in contraction ratio between the materials of the modeling pattern 302 and the support member 303, as shown in FIG. 3 (e1), the upper surface of the modeling pattern 302 differs from the upper surface of the support member 303 in the height from the base material 301.

Next, transfer is performed as shown in FIG. 3 (d1). The modeling pattern 302 is transferred together with the support member 303 from the base material 301 to another base material 304.

By repeating the above-described process, a stacked object is formed. Since the thickness of each layer varies greatly from part to part, the layers 302 of modeling patterns are not aligned as desired as shown in FIG. 3 (e2), and are stacked in a distorted state as shown in FIG. 3 (f1).

On the other hand, the embodiment of the present invention is as follows. A modeling pattern 202 is formed on a board member 201 (a2). Next, a board member 204 is brought into contact with the surface of the modeling pattern 202 on the side opposite to the base material (b2). The material 203 of a support member is injected between the board-like board member 201 and the base material 204 (c2). The material of a support member is hardened (d2). The board member 201 functions as a restricting member that restricts the upper surfaces of the layer 202 of the modeling pattern and the layer 203 of the support member. Therefore, the surfaces of the layer of the support member and the layer of the modeling pattern can be formed at the same height and flat, and therefore a structure that does not have any distortion is manufactured as shown in FIG. 3 (e2).

Figure 4:
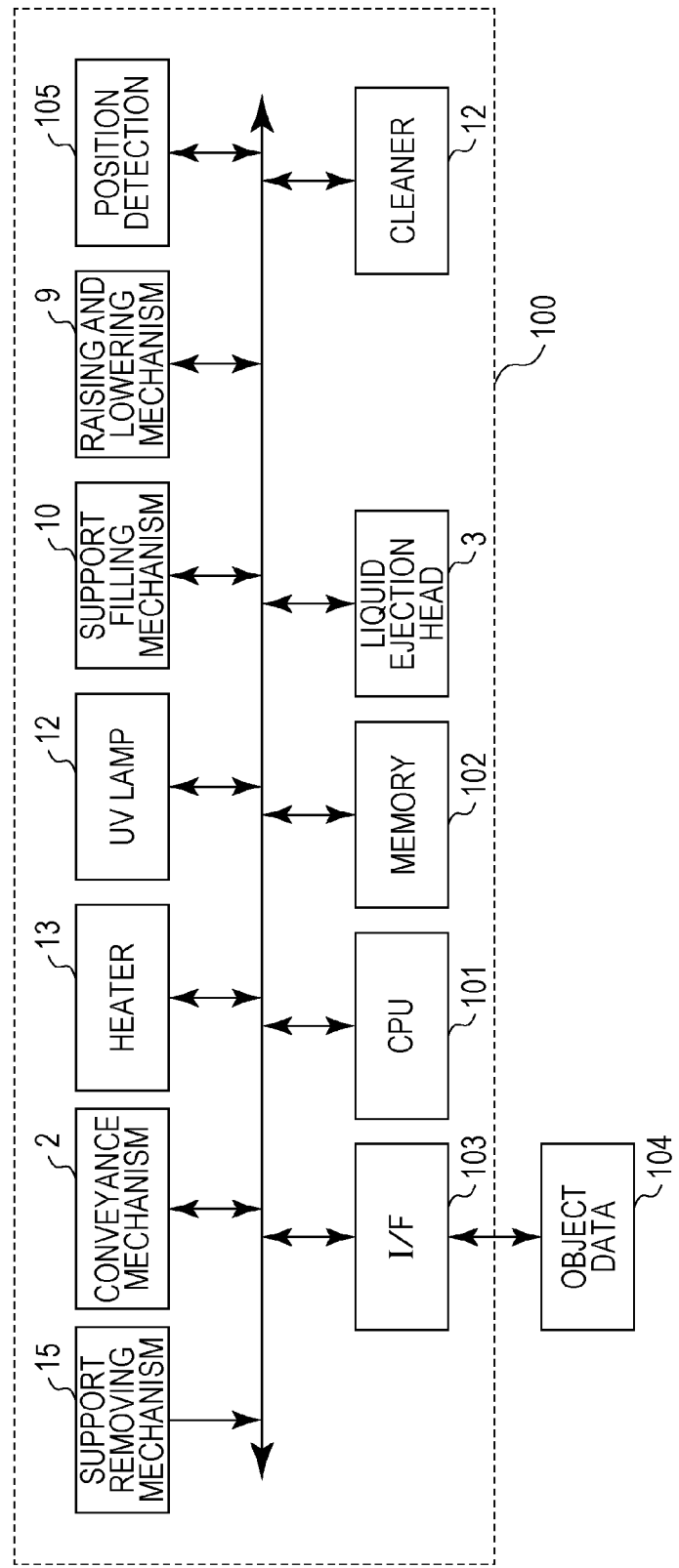
FIG. 4 is a conceptual diagram showing the function of a stacking modeling apparatus according to an embodiment of the present invention.

FIG. 4 shows an example of a control system of the apparatus for modeling a three-dimensional object of FIGS. 1A and 1B. In the apparatus for modeling a three-dimensional object as a structure manufacturing apparatus, the whole of which is denoted by reference numeral 100, a CPU 101 is a main control unit of the entire system and controls each sections. A memory 102 includes a ROM storing a basic program of the CPU 101, and a RAM used for storing object data 104 taken in through an interface 103 and as a work area for data processing. Upon receiving a modeling start signal, the CPU 101 starts the processing of converting the object data into slice data output according to set conditions, and performs communication for checking the states of the conveyance mechanism 2, inkjet 3, raising and lowering mechanism 9, support filling mechanism 10, and cleaner 12. If modeling can be started, the conveyance mechanism 2 and the raising and lowering mechanism 9 move to predetermined positions based on the information of the position detection 105, an ejection signal is sent to the inkjet 3, and modeling starts. When the stacking of layers to be a three-dimensional object is completed, communication for checking the state of the removing mechanism 15 is performed in order to remove the support member, and removal is started.

Third Embodiment

FIGS. 7A to 7E are schematic sectional views showing steps of a manufacturing method of an object according to a third embodiment of the present invention viewed at the position of a cross-section. The cross-sections are taken at the same position as FIGS. 5A to 5F and 6A to 6F.

In this embodiment, after the stacking for forming a structure is completed, stacking of the next structure is performed without removing the support member.

Figure 7A:
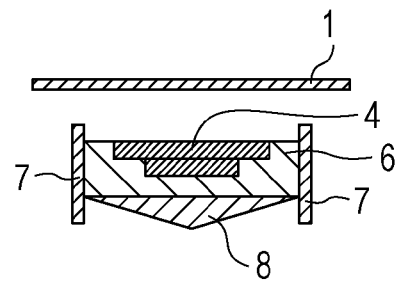
FIGS. 7A-7E are schematic sectional views showing a part of the process of the manufacturing method of a structure in the stacking modeling apparatus according to a third embodiment of the present invention.

FIG. 7A shows the same state as the state shown in FIG. 6F. Over the modeling table 8 in the modeling container 7, modeling patterns 4 supported by a support member 6 are stacked. In this embodiment, at this stage, the stacking of modeling patterns 4 forming a structure is completed.

Figure 7B:
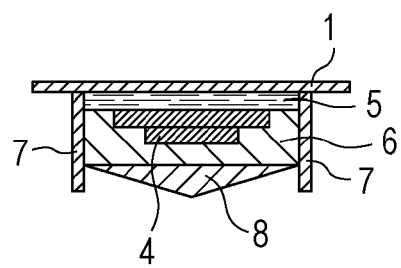

Next, as shown in FIG. 7B, the intermediate transfer member 1 and the modeling unit are moved closer to each other, and a material 5 of support member is injected so as to fill the space between the stacked modeling patterns 4 and the intermediate transfer member 1.

Figure 7C:
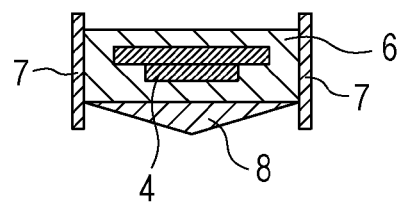

The intermediate transfer member 1 is peeled, and as shown in FIG. 7C, the layer of the modeling pattern 4 is buried in the support member 6.

Figure 7D:
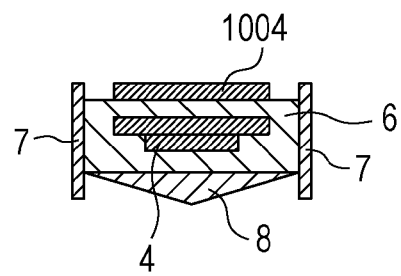

Next, as shown in FIG. 7D, a layer of a modeling pattern 1004 for making a new structure is provided on the surface exposed by peeling the intermediate transfer member 1. The next modeling pattern 1004 is stacked thereon.

Figure 7E:
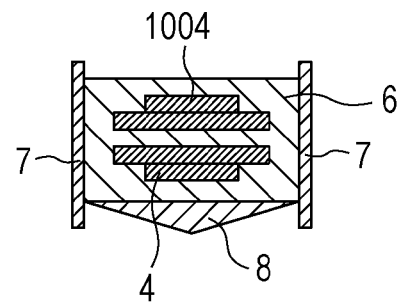

After that, the expansion of the modeling pattern 1004 and the expansion of the support material 6 are performed sequentially as shown in FIG. 7E. After that, the support member 6 is removed by dissolving or the like. Thus, two separate structures formed by stacking modeling patterns 4 and 1004 can be obtained.

Example 1

An example of the present invention will be described below.

The data of an object were preliminarily converted into slice data with a given interlayer spacing. In Example 1, slice data with a spacing of 25 micrometers was used.

As an intermediate transfer member 1, a belt made by forming a layer of fluororubber (DAI-EL T530 manufactured by Daikin Industries, Ltd.) 150 micrometers in thickness on a PET film 50 micrometers in thickness was used.

A pattern of UV ink was applied on the intermediate transfer member 1 using an inkjet unit according to the first layer slice data of the object.

When only colored inks are used, the amount of ink applied cannot be equalized. Therefore, the ink volume was adjusted to a constant value using clear ink.

Ink application conditions
Liquid droplet size=30 pl
Droplet application interval=600 dpi
Amount of ink applied per address=150 pl
Ink prescription
Pigment: 1 part
Black: carbon black
Cyan: pigment blue 15
Magenta: pigment red 7
Yellow: pigment yellow 74
White: titanium oxide
Clear: microparticulate silica
Styrene-acrylic acid-copolymer of acrylic acid and ethyl: 10 parts (acid value: 180, average molecular weight: 4000)
Light curing resin: 20 parts
(water-soluble trifunctional acrylate)
Photoinitiator: 2 parts
(water-soluble acylphosphine)
Diethylene glycol: 6 parts
Ethylene glycol: 3 parts
Surface active agent: 1 part (Acetylenol EH manufactured by Kawaken Fine Chemicals Co., Ltd.)
Ion-exchanged water: The rest The intermediate transfer member is transparent, and can receive hardening light emitted by a UV lamp disposed inside, from the reverse side of the belt.

At the time of patterning, ink is irradiated relatively strongly in order to prevent color mixture and excessive spread of ink. However, the amount of light was adjusted so that flowability was kept until stacking.

As shown in FIGS. 1A and 1B, while the ink pattern 4 applied on the belt-like intermediate transfer member 1 is conveyed by the intermediate transfer member 1, water in the ink is evaporated.

The stacking process will be described below with reference to FIGS. 5A to 5F. FIGS. 5A to 5F are schematic sectional views for explaining a part of the manufacturing process in the manufacturing apparatus of a structure according to an embodiment of the present invention, and show the same section as FIG. 1A.

Figure 5A:
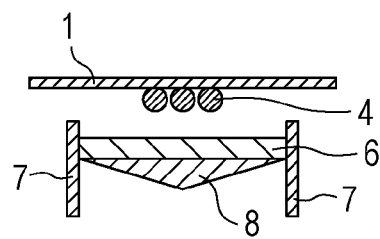
FIGS. 5A-5F are schematic sectional views showing a part of the process of the manufacturing method of a structure in the stacking modeling apparatus according to the first embodiment of the present invention.

In the stacking unit, before receiving the modeling pattern 4, a support member was preliminarily placed on the modeling table 8 (FIG. 5A). Thus, it became easier to take out the object after the stacking is completed, and the gap between the intermediate transfer member 1 and the transfer surface was able to be made tidy.

Figure 5B:
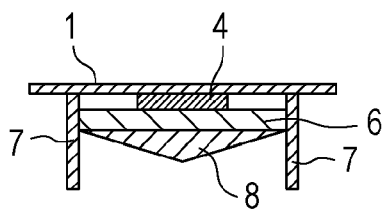
Figure 5C:
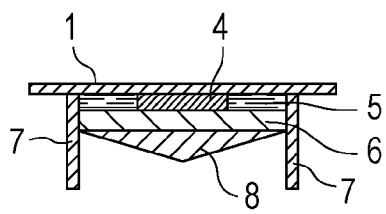

The upper end of the modeling container 7 was brought into contact with a part where there is no modeling pattern 4 of ink, of the surface of the intermediate transfer member 1 on which the ink pattern 4 is provided (FIG. 5B). At this stage, the modeling pattern 4 on the intermediate transfer member 1 was a semisolid having a shape close to a hemisphere, the top thereof came into contact with the support member on the modeling table, and the modeling pattern 4 was compressed to 25 micrometers while being planarized. In this state, irradiated with light, and sandwiched between the intermediate transfer member 1 and the solidified support material 6, a slice pattern of the modeling pattern 4 was made.

With the modeling table 8 lowered by one layer thickness, the space between the intermediate transfer member and the solidified support material was filled with a support material heated to about 60 degrees Celsius and melted (Paraffin wax 115 degrees Fahrenheit: commercially available). In order to fill every corner, temperature was controlled by a heater (not shown) on the reverse side of the intermediate transfer member 1, and the flowability of the material 5 of support member was maintained. At this time, a part of the pre-existing support member melts. However, since the modeling pattern 4 is held by the intermediate transfer member 1, displacement does not occur.

Figure 5D:
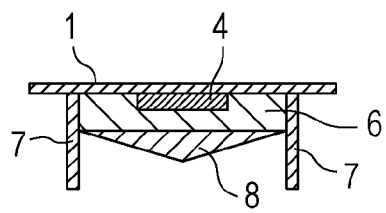

After the filling of support material was completed, air was blown to cool, the material 5 of support member was solidified, and the support 6 was expanded (FIG. 5D).

Figure 5E:
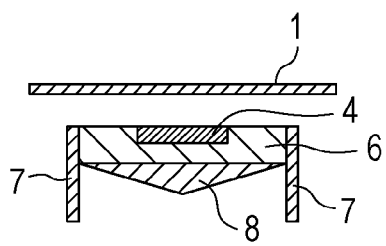

After that, the stacking unit was lowered and the intermediate transfer member 1 was peeled and thereby removed from the unit (FIG. 5E).

Figure 5F:
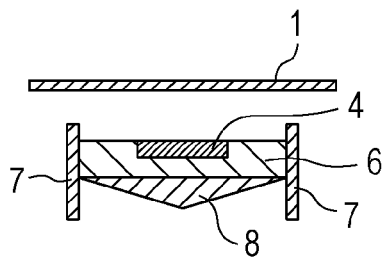

After that, the whole stacking unit was lowered, and the intermediate transfer member 1 was peeled from the ink pattern 4 (FIG. 5E). After that, the modeling table 8 was lowered (FIG. 5F).

After the ink pattern is transferred, the surface of the intermediate transfer member is cleaned by a cleaner, and the intermediate transfer member is used repeatedly.

This was repeated. After all of the layers of modeling patterns were stacked, the temperature was raised to 60 degrees Celsius, the support material melted, and a colored structure was able to be taken out.

In the finished structure, peeling between layers was not observed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-137917, filed Jun. 19, 2012, which is hereby incorporated by reference herein in its entirety.

The invention claimed is:

1. A manufacturing method of a structure comprising:
   providing a first planar surface;
   providing a first material layer on the first planar surface;

positioning a restricting member having a second planar surface relative to the first planar surface with the second planar surface in contact with the first material layer such that a space is defined by the first material layer, the first planar surface and the second planar surface of the restricting member;

injecting a support material into the space to form a support member, the support material being a material different from the first material layer;

removing the restricting member from the first material layer to expose a third planar surface of the first material layer and of the support member;

and providing a second material layer on the third planar surface.

2. The manufacturing method of a structure according to claim 1, wherein in the providing the first material layer, the first material layer is provided in a state supported by the restricting member, on the first planar surface.

3. The manufacturing method of a structure according to claim 2, further comprising ejecting the material of the first material layer from a liquid ejection head configured to eject liquid from an ejection port to form the first material layer on the second planar surface of the restricting member.

4. The manufacturing method of a structure according to claim 1, wherein the support member is formed by hardening the support material injected into the space, with the second planar surface of the restricting member in contact with the first material layer.

5. The manufacturing method of a structure according to claim 1, wherein the material for forming the first material layer contains resin.

6. The manufacturing method of a structure according to claim 1, further comprising, after the providing the second material layer, removing the support member.

7. The manufacturing method of a structure according to claim 1, wherein the support material is a paraffin wax.

8. A manufacturing apparatus comprising:
a table configured to support thereon an in-process structure, which is a structure that is in a process of formation, the in-process structure having a first planar surface;
a material layer providing unit configured to provide a first material layer on the first planar surface of the in-process structure supported by the table;
a restricting member having a second planar surface;
a positioning unit configured to relatively position the table and the restricting member relative to each other with the second planar surface in contact with the first material layer such that a space is defined by the first material layer, the second planar surface of the restricting member, and the first planar surface;
and a support member forming unit configured to form a support member by injecting a support material into the space, the support material being a material different from the first material layer;
wherein the positioning unit relatively positions the table and the restricting member so that the restricting member separates from the first material layer to expose a third planar surface of the first material layer and of the support member, and the material layer providing unit provides a second material layer on the third planar surface.

9. The manufacturing apparatus according to claim 8, wherein the material layer providing unit provides the first material layer in a state supported by the restricting member, on the first planar surface of the in-process structure.

10. The manufacturing apparatus according to claim 9, further comprising a liquid ejection head configured to eject liquid from an ejection port, wherein the liquid ejection head ejects the material for forming the first material layer to form the first material layer on the second planar surface of the restricting member.

11. The manufacturing apparatus according to claim 8, wherein the support member providing unit hardens the support material injected into the space to form the support member, with the second planar surface of the restricting member in contact with the first material layer.

12. The manufacturing apparatus according to claim 8, wherein the material for forming the first material layer contains resin.

13. The manufacturing apparatus according to claim 8, further comprising a support member removing unit configured to remove the support member.

14. The manufacturing apparatus according to claim 8, wherein the support material is a paraffin wax.

* * * * *